United States Patent [19]

Bhagwat et al.

[11] Patent Number: 5,663,873
[45] Date of Patent: Sep. 2, 1997

[54] BIAS POWER HAVING A GAPPED TRANSFORMER COMPONENT

[75] Inventors: Pradeep Madhav Bhagwat, Baltimore, Md.; Chadd Dial Justo, Jersey City, N.J.; Harry J. Britton, South Toms River, N.J.; Hamid Kashani, Ocean, N.J.

[73] Assignee: Electronic Measurements, Inc., Neptune, N.J.

[21] Appl. No.: 606,900

[22] Filed: Feb. 26, 1996

[51] Int. Cl.$^6$ ................................. H02M 3/335
[52] U.S. Cl. ............................. 363/20; 363/21
[58] Field of Search .................... 363/17, 20, 21, 363/132; 323/282, 362

[56] References Cited

U.S. PATENT DOCUMENTS

| | | | |
|---|---|---|---|
| 3,924,172 | 12/1975 | Gregorich | 363/21 |
| 4,371,918 | 2/1983 | Schierjott | 363/22 |
| 4,864,479 | 9/1989 | Steigerwald et al. | 363/17 |
| 5,073,849 | 12/1991 | Morris | 363/21 |
| 5,245,520 | 9/1993 | Imbertson . | |
| 5,249,113 | 9/1993 | Perol | 363/24 |
| 5,506,764 | 4/1996 | Hon et al. | 363/21 |

*Primary Examiner*—Stuart N. Hecker
*Attorney, Agent, or Firm*—Michaelson & Wallace; Peter L. Michaelson; John C. Pokotylo

[57] ABSTRACT

A half bridge power converter which employs a gapped transformer which permits stable asymmetrical operation without the use of a separate choke arranged in parallel with the primary of the transformer. The half bridge power convert may include a small capacitor on its secondary side to cause a high ripple of the output current thereby permitting stable asymmetrical operation with smaller magnetizing currents.

1 Claim, 7 Drawing Sheets

BIAS POWER HAVING A GAPPED TRANSFORMER COMPONENT

BACKGROUND OF THE INVENTION a. Field of the Invention

The present invention concerns power conversion. In particular, the present invention concerns a DC—DC half bridge asymmetrical fixed frequency pulse width modulation power converter topology, which utilizes a gapped transformer with increased magnetizing current for zero-volt switching condition from no load to full load operation. The present invention ensures transformer volt-sec and centertap capacitor amp-sec balance under any load condition with less costly components than the prior art.

b. Background of the Invention

In general, various electronic power converter topologies are used for voltage or current regulation, DC to DC power conversion, DC to AC power conversion, and power conditioning. The primary design goals in any of these power converters will include: (i) compact physical size; (ii) high power efficiency; (iii) low electro-magnetic interference (or "EMI"); (iv) low radio-frequency (or "RF") interference; (v) low part count; and (vi) low production costs. By providing a low cost power converter having a compact physical size, raw DC power can be fed throughout a major electronic system and each sub-system (or printed wiring board) may be provided with its own power converter. In switching power converters, a further design consideration is stresses imposed on the power transistors. Specifically, a well designed switching power converter will minimize voltage stresses of power transistors at light line loads and will minimize peak current stresses of power transistors at maximum output power.

As shown in FIG. 3.1 of the book Abraham Pressman, *Switching Power Supply Design*, p. 94, McGraw-Hill (1991) (hereinafter referred to as "the Pressman text"), a conventional half-bridge power supply uses a small capacitor $C_b$, arranged in series with the primary winding of the transformer, to avoid "flux imbalance". (See FIG. 1.) Flux imbalance may be thought of as a DC current bias in the primary. If the volt-second product across the primary when the core of the transformer is "set" (i.e., moved in one direction along its hysterisis loop (or B-H plot)) differs from the volt-second product when the core is moved in the other direction along its hysterisis loop, the core will "walk" up or down the hysterisis loop due to such a difference. This will cause the core to saturate and consequently, switching transistors will be destroyed. Thus, avoiding flux imbalance can be thought of as maintaining "transformer balance".

The capacitor $C_b$ used in the half bridge converter discussed in the Pressman text avoids DC current bias and ensures that the voltage at the junction of the voltage divider (formed by capacitors C1 and C2) is stable.

U.S. Pat. No. 5,245,520, issued to Imbertson (hereinafter referred to as "the Imbertson patent"), discloses a asymmetrical duty cycle power converter. (See FIG. 2a.) Specifically, during conditions of low load or highly asymmetric operation, the switch Q1 may be closed for as little as 10 percent of the duty cycle, while switch Q2 is on (i.e., closed) for the remainder of the switching period. The reflected load, controlled by the inductor $L_o$, is the same for both the first and second legs of a switching period. That is, the inductive load $L_o$ pulls a constant current. Under such conditions, the known half-bridge topologies become relatively unstable. Specifically, to maintain DC bias voltage on the input capacitors C1 and C2, the transistors Q1 and Q2 must provide balanced amp-seconds. This requirement is illustrated in FIG. 2b in which $I_2(D)=I_1 (1-D)$. When the duty cycle is less than 50 percent (i.e., D<0.5), which is known as "asymmetrical" operation, the magnitude of the current $I_1$ will not equal the magnitude of the current $I_2$. However, as mentioned above, the inductive load $L_o$ pulls a constant current. This dilemma results in unstable operation.

The Imbertson patent eliminates this problem by providing a balance inductor $L_b$ in parallel with the transformer. A unidirectional current $I_b$ flowing through the balance inductor $L_b$ adds to the magnitude of the bridge current $I_2$ delivered to the load during the first part of the period and diverts bridge current $I_1$ from reaching the load during the second part of the period. The balance inductor $L_b$ must be properly sized to assure balanced time-current products. In this way, the inductive load $L_o$ pulls a constant current and DC bias voltage is maintained on the input capacitors C1 and C2.

In addition, to assure lossless switching, even at low output loads, the device discussed in the Imbertson patent adds an inductor $L_c$ in series with the transformer. This inductor $L_c$ charges and discharges the parasitic switch capacitances much like a resonant pole converter. Unfortunately, the inductors $L_b$ and $L_c$ employed in the circuit discussed in the Imbertson patent are relatively expensive components which preclude the feasible use of such power converters on each sub-system of a major electronic system.

Thus, a low cost power converter is needed. Such a power converter should operate in a stable manner (i.e., avoid flux imbalance), even under low load conditions and asymmetric operation. It is a goal of the present invention to provide such a low cost power converter.

SUMMARY OF THE INVENTION

The present invention achieves each of the aforementioned goals by providing a half-bridge converter having a gapped transformer. A preferred embodiment of the present invention includes a relatively small capacitor (e.g., 3 microfarad) arranged across the rectified output.

BRIEF DESCRIPTION OF THE DRAWINGS

FIG. 2b is a current waveform illustrating a system requirement of the converter of FIG. 2a.

FIGS. 4a and 4b are voltage and magnetizing current waveforms, respectively, associated with the transformer of FIG. 3, while

FIGS. 6a through 6c are voltage, magnetizing current, and stored energy waveforms, respectively, associated with the gapped transformer of FIG. 5a, while

DETAILED DESCRIPTION

Figure 3:
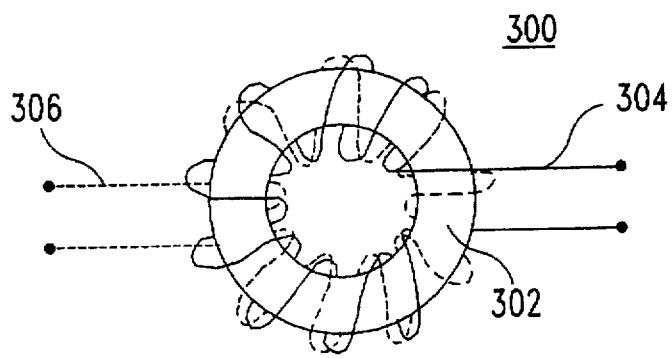
FIG. 3 illustrates an idealized torroidal transformer.
Figure 4A:
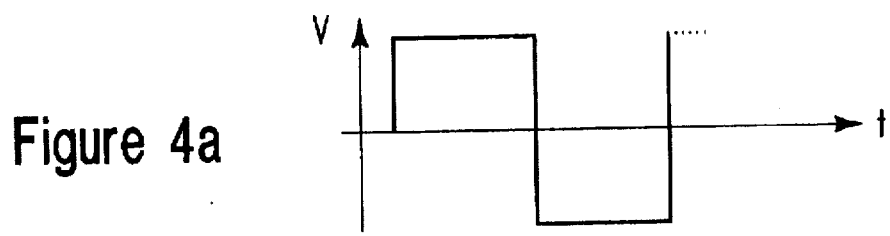
Figure 4B:
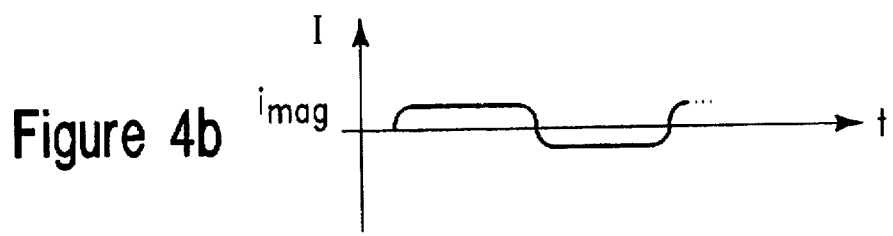
Figure 4C:
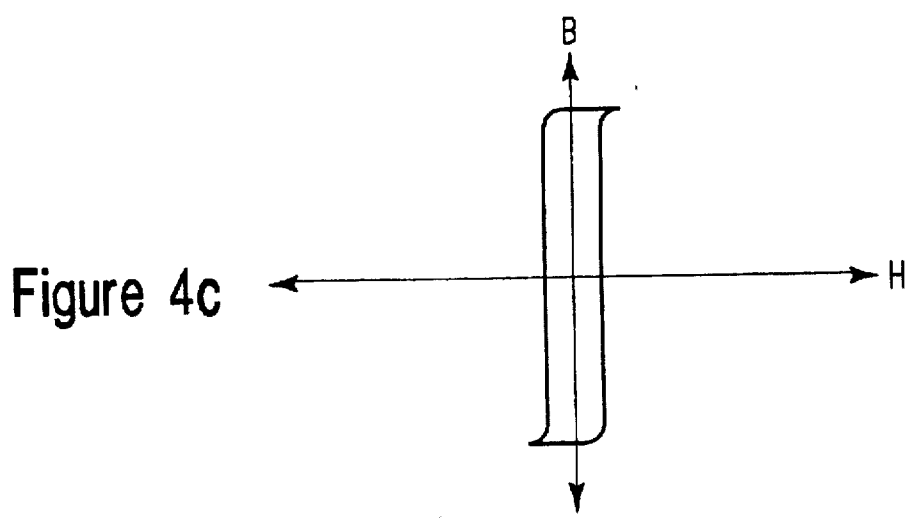
FIG. 4c is a B-H hysterisis plot of the transformer of FIG. 3.

FIG. 3 illustrates an idealized transformer 300 having a ring shaped ferromagnetic core 302 and primary 304 and secondary 306 windings. As shown in FIGS. 4a through 4c, when the idealized transformer 300 of FIG. 3 is excited with a square wave (See FIG. 4a), the magnetizing current is essentially a square wave having a peak current of $i_{mag}$ (See FIG. 4b). This peak current $i_{mag}$ is the current needed to produce a magnetic field $H_c$ in the core.

Figure 5A:
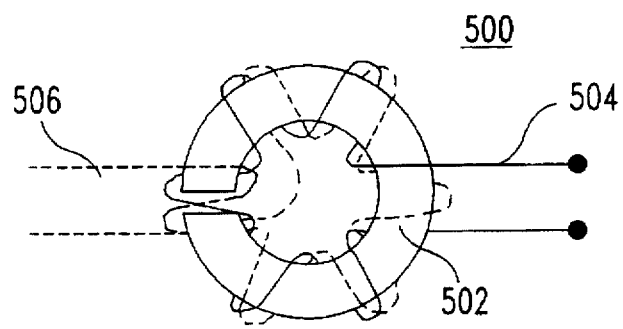
FIG. 5a illustrates a transformer with an air gap which provides a single inductor-transformer element which, as shown in the equivalent circuit for FIG. 5b, performs both the function of a transformer and the function of an inductor.

As shown in FIG. 5a, the inductor-transformer element 500 of the present invention includes a torroidal ferromagnetic core 502 having a defined air gap 508. The inductor-transformer element 500 also includes a primary winding 504 and a secondary winding 506. The inductor-transformer element 500 is similar to the idealized transformer 300 except that it includes the air gap 508 in the ferromagnetic core 502. Assuming that the air gap 508 is a small fraction of the magnetic path, the inductor-transformer element 500 exhibits a "virtual inductance" which is proportional to the volume of the air gap.

Figure 5B:
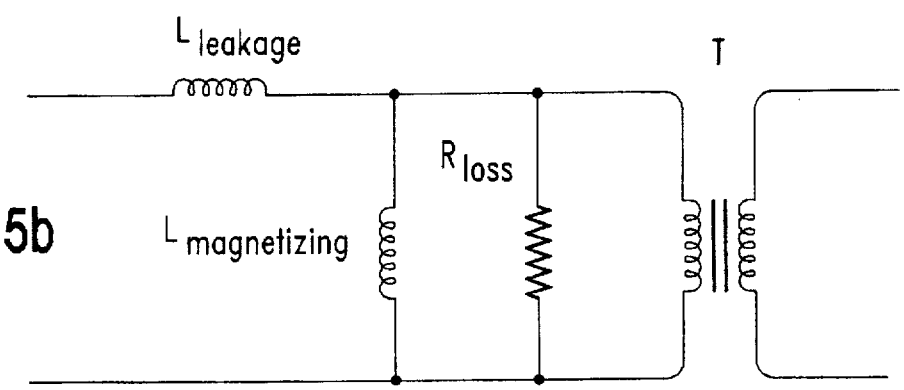

FIG. 5b is the equivalent circuit of the air gapped transformer 500. The resistance $R_{loss}$ represents loss in the magnetic components. The inductor $l_{leakage}$ represents the series leakage inductance of the primary and secondaries (if more than one). The inductor $L_{magnetizing}$ represents a "virtual inductor", created by the air gap in the transformer, which stores energy. In fact, the magnetic energy is stored in the air gap. The "virtual inductor" $L_{magnetic}$, in parallel with the ideal transformer, draws a much higher magnetizing current than would occur with an ungapped transformer.

Figure 6A:
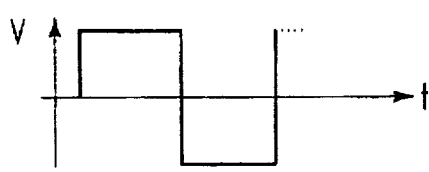
Figure 6B:
Figure 6D:
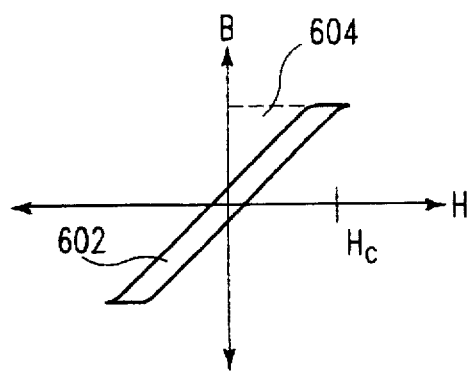
FIG. 6d is a B-H hysterisis plot of the gapped transformer of FIG. 5.
Figure 6C:
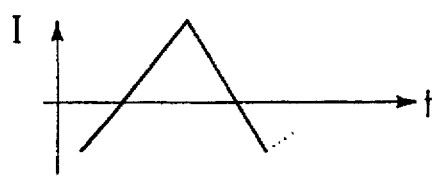

As shown in FIGS. 6a through 6c, when the gapped transformer 500 is excited with a square wave (See FIG. 6a), the magnetizing current is essentially a square wave having a peak current of $i_{mag}$ (See FIG. 6b) as was the case with the transformer 300. This peak current $i_{mag}$ is the current needed to produce a magnetic field $H_c$ in the core and is in phase with the excitation voltage. In addition, a current having a triangular waveform, which represents energy stored in the air gap 508, is also produced. (See FIG. 6c ) This current, which lags the excitation voltage by 90 degrees, can be thought of as energy flowing into and out from a "virtual inductor".

FIG. 6d is the magnetic hysterisis plot of the magnetic flux density B versus the magnetic field strength H of the inductor-transformer element 500. The area 602 of the plot represents core losses while the triangular area 604 above the plot represents energy stored in the magnetic field.

Figure 1:
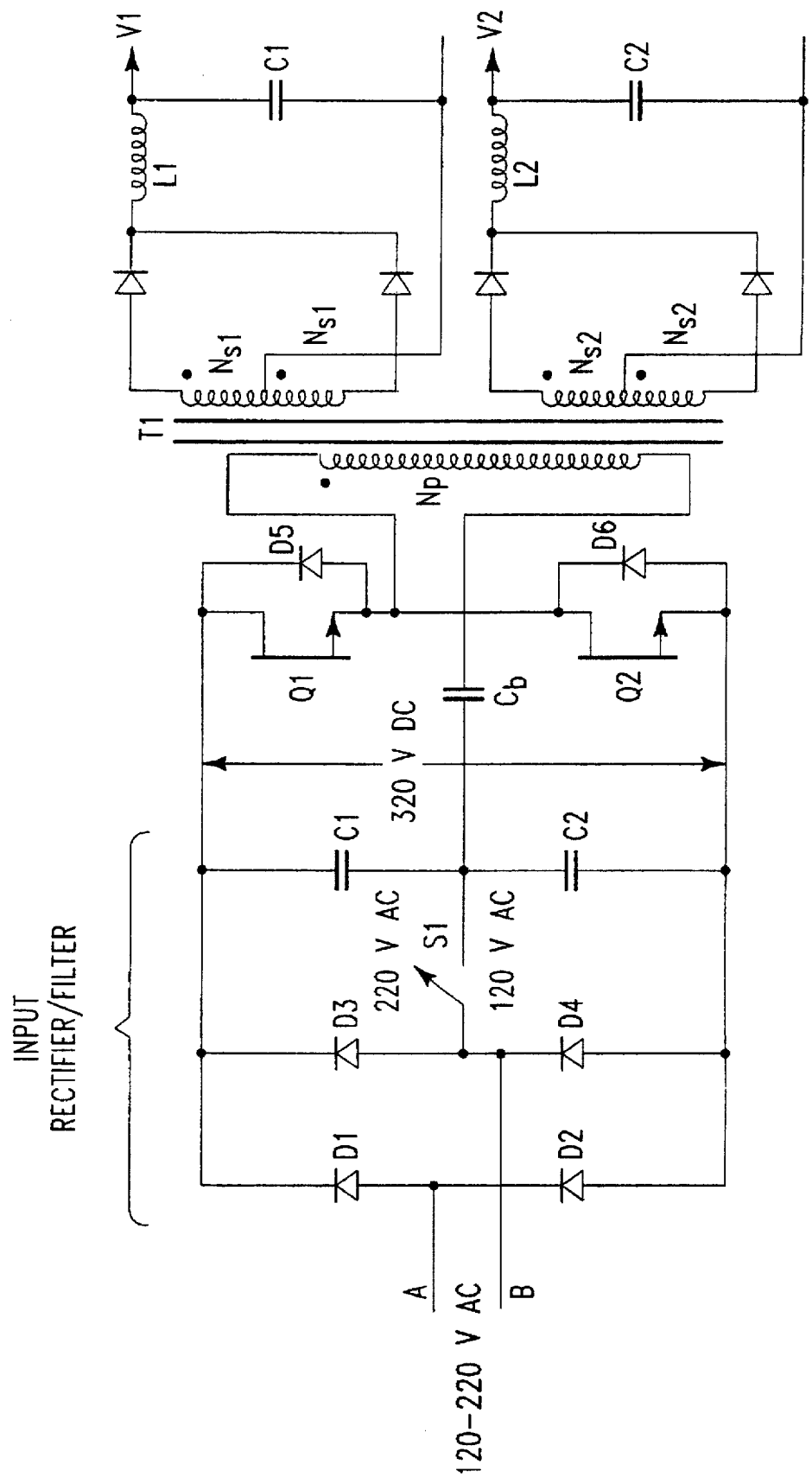
FIG. 1 is a schematic of a conventional half-bridge power converter which includes a capacitor $C_B$ to avoid flux imbalance.
Figure 2A:
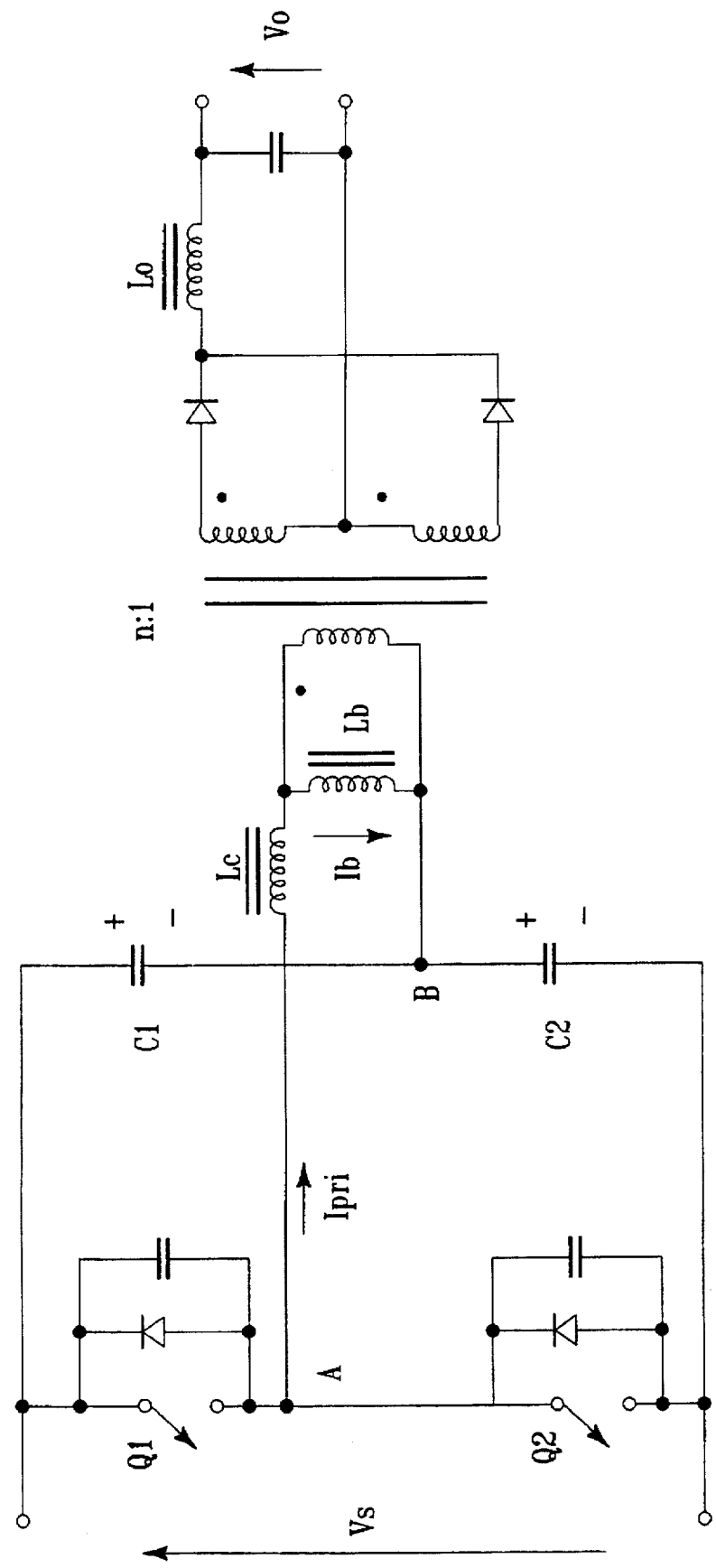
FIG. 2a is a schematic of a conventional half-bridge power converter which includes a parallel inductor for maintaining a balanced current-amp product through (i.e., a bounded centertap voltage between) its input capacitors and which includes a series inductor for storing energy to charge parasitic capacitor voltages to permit lossless switching under low loads.
Figure 7:
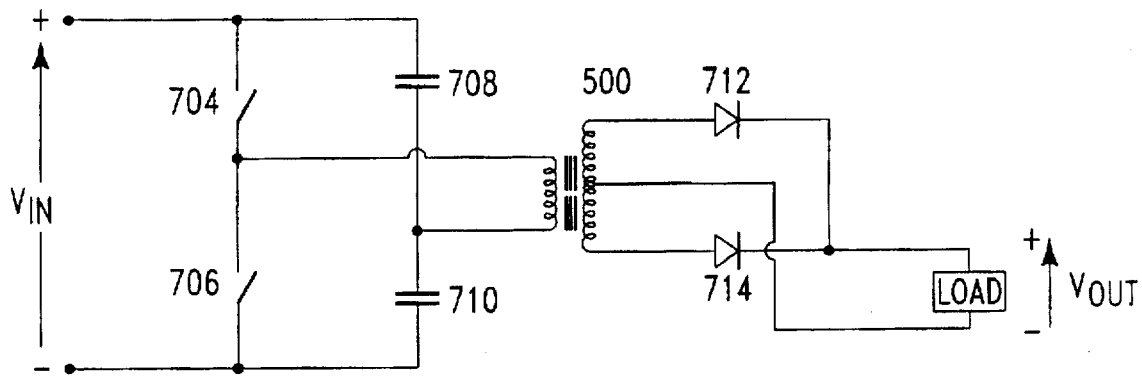
FIG. 7 is a half-bridge power converter topology of the present invention which employs the gapped transformer element of FIG. 5.

The inductor-transformer element 500 of FIG. 5 is used in the half-bridge power converter of the present invention shown in FIG. 7. The "virtual inductance" of the inductor-transformer element 500 is exploited such that a balancing inductor, such as the inductor $I_b$ disclosed in the Imbertson patent (see FIG. 2a ), is not required. It should be noted, however, that the "virtual inductance" created by the air gap of the gapped transformer 500 inherently differs in operation from the balance inductor $L_b$ of the Imbertson patent. Specifically, the air gap can't directly (inductively) supply energy to the load; rather, it dumps energy onto an input capacitor 708 or 710 which then supplies it to the load via the transformer 500.

Figure 2B:
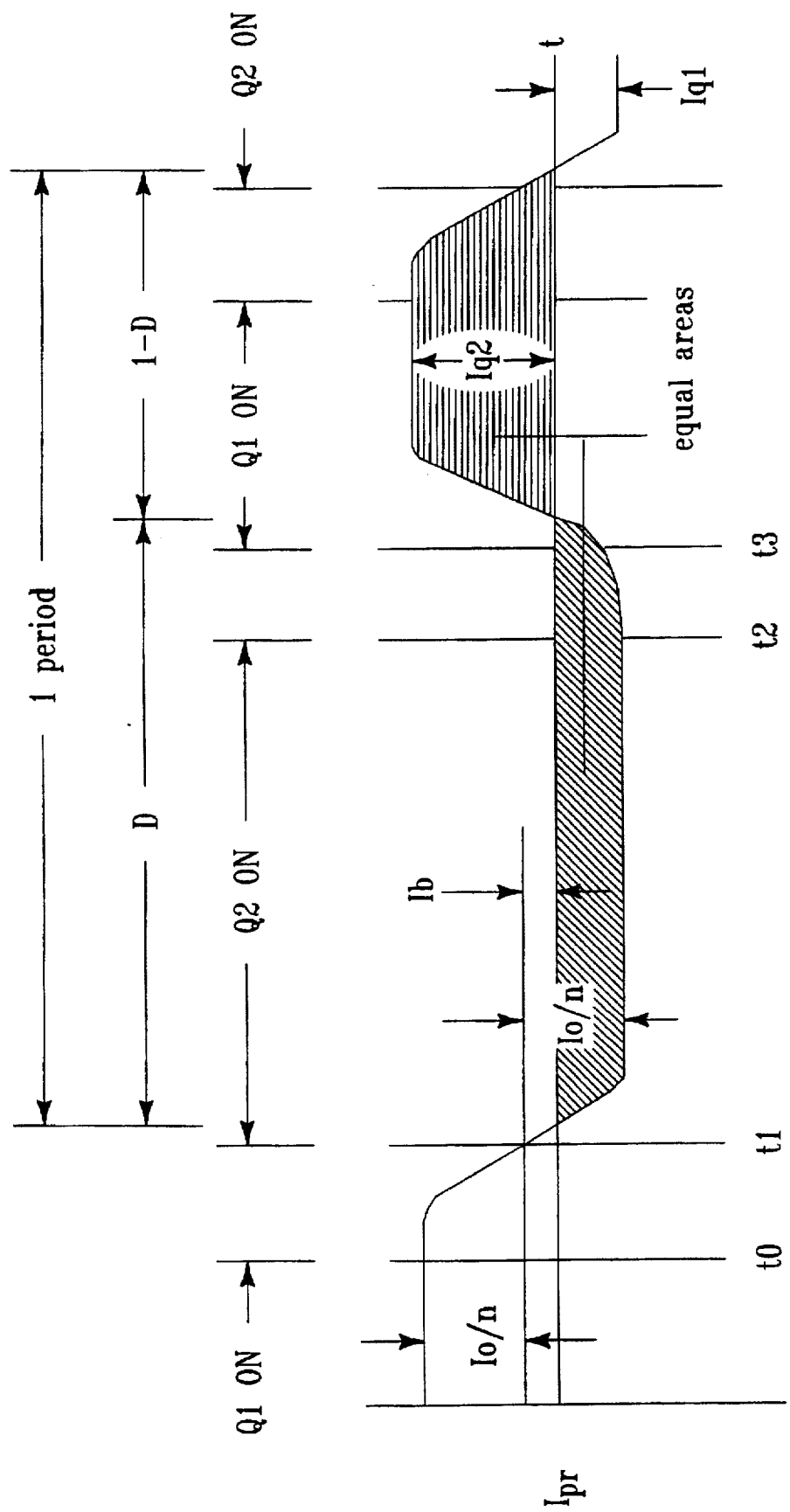

The asymmetric half-bridge power converter of FIG. 7 is a simple, low-cost, power converter. It uses two switches 704 and 706, rather than the four switches required by full-bridge power converters. More importantly, as mentioned above, the half-bridge converter of FIG. 7 does not require the relatively expensive inductors $L_b$ and $L_c$ which are required by the conventional half bridge converter discussed in the Imbertson patent and shown in FIG. 2. This is, in part, because the magnetizing current due to the "virtual inductance" maintains a balanced current-amp product through (i.e., a bounded voltage on the centertap of) the input capacitors 708 and 710 while an inductive load, not shown, pulls a constant current. The capacitors 708 and 710, as well as the diodes 712 and 714 are relatively inexpensive. Producing the inductor-transformer element 500 of the present invention is no more expensive than the production of a conventional transformer.

As discussed above, to avoid flux imbalance and to maintain stable operation, (i) the volts-second product across the primary winding 504 during the first half cycle must be equal to that during the second half cycle, and (ii) the net differential charge accumulated on the capacitor 710 over both half cycles must be zero. To reiterate, the higher magnetizing current required by the air gap 508 of the core 502 of the inductor-transformer element 500 of the present invention assures each of these conditions to permit stable operation.

In a preferred embodiment of the converter of FIG. 7, printed wiring technologies are used to construct the primary and secondary windings 504 and 506, respectively. The primary 504 preferably consists of eight (8) turns of four (4) ounce copper foil while the secondaries 506 are one (1) turn each. The core 502 is preferably a planar magnetic core, for example part no. 44308-EC sold by Magnetic Inc. of Butler, Pa. However, the particular shape of the magnetic core 502 is not important, so long as its B-H plot corresponds to that shown in FIG. 6b in which the air gap stores magnetic energy as a "virtual inductor". The air gap 508 is preferably 0.005 inches and is defined by inserting 0.005 include thick polyester film between the core parts. Primary side switches 708 and 710 are preferably FETs such as part no. IRF-250 sold by International Rectifier Inc. The capacitors 708 and 710 are preferably 0.47 microfarads at 200 volt rating. The diodes 712 and 714 are preferably a single part, for example part no. HFA30PA60C, made by International Rectifier. The output voltage is preferably adjustable between 9.6 and 18 volts at 600 watts.

Figure 8:
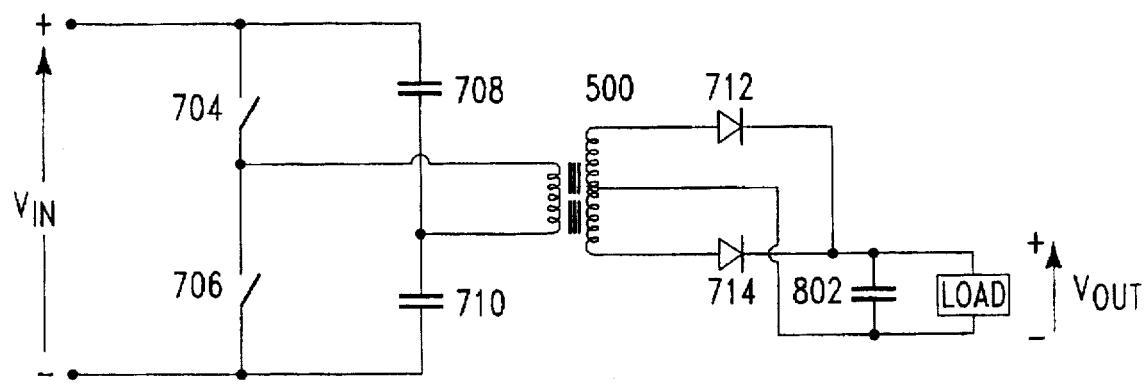
FIG. 8 is an alternative embodiment of the half-bridge power converter topology of the present invention.

FIG. 8 is an alternative embodiment to the half-bridge power converter of FIG. 7. The half-bridge power converter of FIG. 8 is identical to that of FIG. 7 except that a relatively small capacitor 802 (e.g., 3 µF) is coupled across the output windings 506. The small capacitor 802 is provided in addition to the relatively large filter capacitors used in an output filter (not shown). The capacitor 802 is sized to resonate with the leakage inductance of the primary 504 of the inductor-transformer 500 element at a frequency ten (10) times the switching frequency (e.g., 30 KHz) of the switches 704 and 706.

Figure 9A:
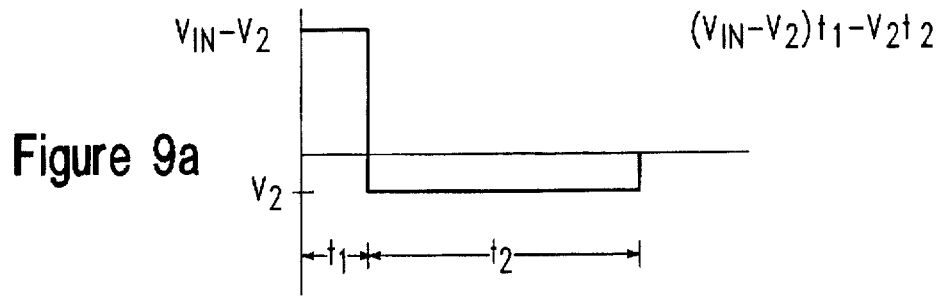
FIGS. 9a and 9b illustrate idealized voltage and current waveforms, respectively, of the converter of FIG. 7.

FIG. 9a illustrates the primary voltage waveform during a period of low load. For example, the first switch 704 is closed for about 20 percent of the time and the second switch 706 is closed for almost the remaining 80 percent of the time. There is a short dead time (e.g., 100–200 ns) during which neither switch is closed. This prevents the occurrence of a short across the switches. The secondary current, provided to an inductive load, will flow only when the first switch 704 is closed because the output voltage during the remaining time is lower than the voltage on the output capacitor.

Figure 9B:
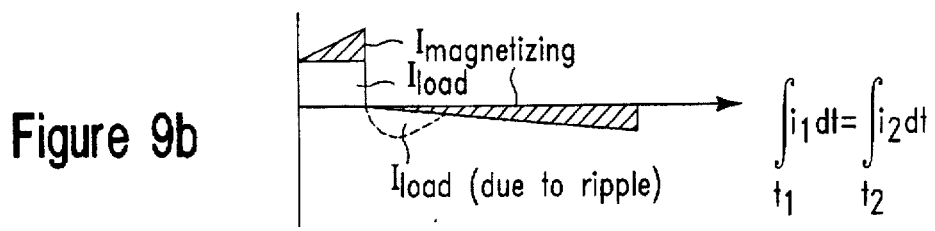

The primary current is shown in FIG. 9b. When the first switch 704 is closed, the primary current consists of reflected load current and magnetizing current. When the second switch 706 is closed, the primary current consists of magnetizing current only. It can be seen that the areas that these curves are equal and it can also be easily seen, that if the transformer was ungapped and these magnetizing current become very small, the system is inoperable. Indeed this is the essence of the present invention.

Figure 10:
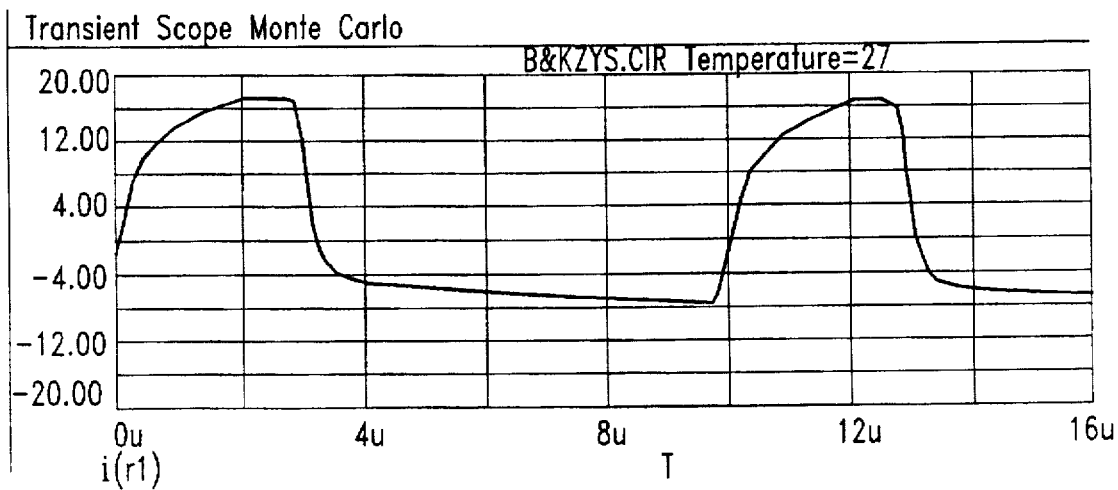
FIG. 10 is a plot of an actual primary current of a gapped transformer of a power converter constructed in accordance with FIG. 8.

In a non-ideal circuit, some load current will flow during the early part of the period when the second switch 706 is closed as shown in the dotted line of FIG. 9b. This is due to ripple voltage on the capacitor 803 of FIG. 8. This normally undesirable ripple, is advantageous in this instance since it allows stable operation with a lower magnetizing current. FIG. 10 is a simulated plot of primary current through a gapped transformer in the circuit of FIG. 8. To reiterate, in most instances, the ripple across the capacitor 802 is unsuitable. However, the capacitor 802 is sized such that significant voltage ripple occurs across the capacitor. This is an important feature of the stabilization process. Specifically, in many cases, when the switches 704 and 706 are applied with a low duty cycle switching signal, output current from the secondary 506 of the inductor-transformer 500 occurs during only a first part of the cycle, when the switch 704 is closed. The large ripple current helps maintain a balanced amp-second product through (i.e., a bounded voltage on the centertap of) the input capacitors C1 and C2, even at lower magnetizing current. Thus, the capacitor 802 also permits the gapped transformer 500 to have a smaller air gap. Consequently, less current is wasted as magnetizing current.

Additionally, during the longer part of the switching cycle, when the voltage is lower, the small capacitor 802, which had been charged during the shorter part of the switching cycle, will reverse bias the diodes 712 and 714 such that the diodes 712 and 714 will not conduct. Thus, not all of the energy is given to the load. This fact further helps maintain the voltage at the centertap of the capacitors 708 and 710.

In a preferred embodiment of the converter of FIG. 8, an "E" core 502 made by Phillips Electronics is assembled with an air gap 508 of 0.030 inches. Polyester spacers defined the air gap 508 at a fixed distance. The primary winding 504 preferably consists of 44 turns of #30 wire over six (6) strands on a bobbin, for example, part no. CSH-EFD30-15-12-D sold by Phillips. The secondary are preferably wound with ten (10) turns of #30 wire over fifteen (15) strands. The switches 704 and 706 are preferably FET switches, for example, part no. IRF740 sold by International Rectifier. The capacitors 708 and 710 are preferably 0.22 microfarad rated at 400 volts DC. The diodes 712 and 714 are preferably part no. SCWQ10F sold by International Rectifier Inc. The capacitor 802 is preferably 3 microfarads. The input voltage may vary, be raw and unregulated power, from 230 to 385 volts DC. The output is 28 volts, regulated to 0.1 percent at zero (0) to 90 watts.

What is claimed is:

1. A half bridge power converter permitting stable asymmetrical operation, the power converter comprising:

a) a set of controllable switches arranged across an input voltage source, the set of controllable switches being coupled in series thereby defining a switching node therebetween;

b) a set of capacitors arranged across the input voltage source, the set of capacitors being coupled in series thereby defining a divided voltage node therebetween;

c) a gapped transformer having a primary winding and a secondary winding being inductively coupled with the primary winding, the primary winding having a first end coupled with the switching node and a second end coupled with the divided voltage node, and the secondary winding providing an output voltage to a load via a rectifier circuit: and d) a capacitor coupled across the positive and negative terminals of the output voltage, wherein the rectifier circuit includes a first diode having its anode coupled with a first end of the secondary winding and a second diode having its anode coupled with a second end of the secondary winding, wherein the cathode of the first diode is coupled with the cathode of the second diode to form a positive terminal of an output voltage and wherein a negative terminal of the outout voltage is coupled to a centertap of the secondary winding, and wherein the capacitor has a capacitance which causes a resonant frequency of at least ten times a switching frequency of the set of switches.

\* \* \* \* \*